May 27, 1952
O. CLONTS
2,598,224
FAUCET
Filed Jan. 12, 1948
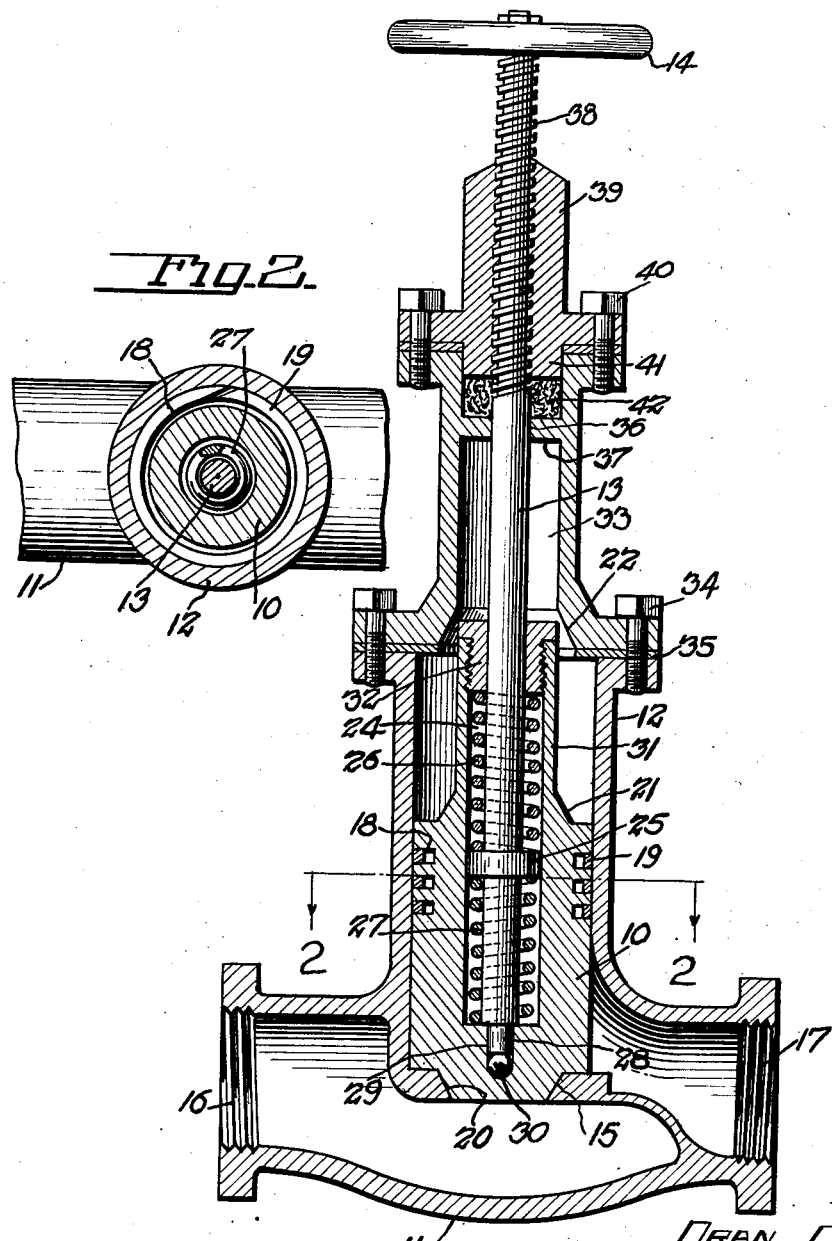
INVENTOR.
ORAN CLONTS
ATTORNEYS Patented May 27, 1952

2,598,224

UNITED STATES PATENT OFFICE 2,598,224

FAUCET

Oran Clonts, Midwest City, Okla.

Application January 12, 1948, Serial No. 1,741

1 Claim. (Cl. 251—32)

This invention relates to valves of the leak proof type having double seats with the second seat provided in the bonnet to prevent leakage, and in particular a valve in which the valve element is provided on the end of a cylinder forming a piston and the piston is actuated by a collar on a valve stem with resilient elements on both sides of the collar.

The purpose of this invention is to provide positive means in a valve bonnet to prevent leakage around the stem.

Various types of packing have been provided around valve stems to prevent leakage and for some uses, particularly as faucets, it is very objectionable to have leakage develop around the valve stem. With this thought in mind this invention contemplates a valve having a seat at each end of the valve member and in which the valve member is in the form of a piston with packing rings thereon, so that leakage around the valve member is substantially impossible.

The object of this invention is to provide means for incorporating a piston in a valve in combination with the valve member to positively prevent leakage around the stem of the valve member.

Another object of the invention is to provide means for actuating the valve member of a valve with a resilient movement in both the opening and closing actions.

A further object of the invention is to provide means for preventing leaking around the stem of a valve in which the valve is of a simple and economical construction.

With these and other objects and advantages in view the invention consists of the new and novel combination, construction, and arrangement of parts as hereinafter more fully described, set forth in the claim appended hereto, and disclosed in the accompanying drawings, forming part hereof, wherein:

Figure 1 is a vertical section through the improved valve with the stem and handle shown in elevation.

Figure 2 is a sectional plan taken on line 2—2 of Figure 1.

Referring now to the drawings wherein like reference characters indicate corresponding parts the improved valve of this invention includes a valve member 10, a valve body 11 with a bonnet 12, and a stem 13 which is provided with a handle 14 at the upper end.

The valve is provided with a seat 15 and the ends 16 and 17 of the body 11 are threaded, as shown. The valve bonnet 12 is cylindrical and the valve member 10 is vertically slidable therein wherein the member 10 forms a piston and the outer surface is provided with annular grooves 18 in which packing rings 19 are provided. The lower end of the member 10 is formed with a conical element 20 that coacts with the seat 15 to close the valve, and the upper end is provided with a similar surface 21 that coacts with a seat 22 in a sleeve 23 at the upper end of the bonnet to close the area around the stem when the valve is in the full open position. With this valve at the upper end of the valve member 10 in combination with the piston and rings therefor there is very little possibility of leakage around the valve stem.

The valve stem 13 extends downward into a bore 24 in the valve member and a collar 25 is provided intermediate of the length of the bore wherein with springs 26 and 27 on opposite sides of the collar the member 10 is actuated through resilient elements, and as the valve is closed the lower spring 27 will be compressed. The lower end of the stem 13 is also provided with a pin 28 that extends into an opening 29 in the lower end of the valve member 10 where it engages a ball 30 which facilitates turning, providing a thrust bearing to reduce friction in the closing action of the valve. The upper end of the member 10 is provided with a sleeve 31 and a threaded bushing 32 is positioned in the end of the sleeve to hold the spring.

The sleeve 31 extends upward into a bore 33 of the sleeve 23 that is bolted to the upper end of the bonnet by bolts 34 with a packing washer 35 between the parts, and the valve stem is rotatably held in an opening 36 in a web 37 at the upper end of the bore. The upper part of the valve stem is provided with threads 38 that screw into a nut 39 which is secured to the upper end of the sleeve 23 by bolts 40, and as the handle is turned the collar 25 actuates the valve member through the springs 26 and 27. The lower end of the nut 39 is provided with a sleeve 41 that extends downward into the upper end of the sleeve 23 forming a packing gland in which is packing 42, as shown.

With the parts arranged in this manner the valve may readily be actuated by turning the handle 14 which compresses the lower spring 27 to close the valve and also compresses the upper spring 26 when turned in the opposite direction, to open the valve, and with the piston rings and upper valve seat both functioning to seal the area around the valve stem there is very little possibility of leakage around the valve stem.

It will be understood that modifications may be made in the design and arrangement of the parts without departing from the spirit of the invention.

What is claimed is:

In a valve, the combination which comprises a valve body having inlet and outlet connections at the ends and a bonnet with a cylindrical inner surface positioned intermediate of the said inlet and outlet connections and extended perpendicularly from a center line through said connections, said body having a web with a valve seat therein positioned between the said inlet and outlet connections, a sleeve having a cylindrical inner surface with a valve seat on the lower end positioned on said bonnet and aligned with the cylindrical inner surface of the bonnet and valve seat of the web of the valve body, an internally threaded nut on the end of said sleeve, a piston having a bore and provided with valve surfaces on the ends providing a valve member and positioned in the said bonnet, spaced packing rings in the peripheral surface of the piston, an extended valve stem with a handle on the outer end threaded in the said nut on the end of the sleeve and extended into the bore of the valve member, said piston having a collar spaced from its lower end positioned in the valve member, springs on the stem positioned in the bore of the valve member and on opposite sides of the said collar, said valve member having an extended guide sleeve extended from the upper end thereof and positioned to coact with the inner cylindrical surface of the sleeve on the end of the bonnet, and a nut on the end of said valve member for holding the end of one of the springs therein and through which the said extended stem passes.

ORAN CLONTS.

REFERENCES CITED

The following references are of record in the file of this patent:

UNITED STATES PATENTS

| Number | Name | Date |
|---|---|---|
| 140,006 | Brown | June 17, 1873 |
| 903,436 | Benzenhafer | Nov. 10, 1908 |
| 918,143 | Goehring | Apr. 13, 1909 |
| 1,858,246 | Mahan | May 17, 1932 |
| 1,929,455 | Smith | Oct. 10, 1933 |
| 2,152,084 | Paine | Mar. 28, 1939 |
| 2,311,851 | McClure | Feb. 23, 1943 |